United States Patent
Pant et al.

(10) Patent No.: US 9,100,881 B2
(45) Date of Patent: Aug. 4, 2015

(54) DYNAMICALLY POPULATING MEDIA INDEPENDENT HANDOVER (MIH) INFORMATION SERVICE DATABASE

(75) Inventors: Nitin Pant, San Diego, CA (US); Ta-yan Siu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 19 days.

(21) Appl. No.: 13/287,963

(22) Filed: Nov. 2, 2011

(65) Prior Publication Data

US 2013/0109386 A1    May 2, 2013

(51) Int. Cl.
| | |
|---|---|
| H04W 36/00 | (2009.01) |
| H04W 72/00 | (2009.01) |
| H04W 4/00 | (2009.01) |
| H04W 48/16 | (2009.01) |
| H04W 84/04 | (2009.01) |
| H04W 92/20 | (2009.01) |

(52) U.S. Cl.
CPC ............ H04W 36/005 (2013.01); *H04W 48/16* (2013.01); *H04W 84/045* (2013.01); *H04W 92/20* (2013.01)

(58) Field of Classification Search
CPC .......................... H04W 36/005; H04W 84/045
USPC ........................................................ 455/436
See application file for complete search history.

(56) References Cited

U.S. PATENT DOCUMENTS

| | | | |
|---|---|---|---|
| 2007/0254620 A1* | 11/2007 | Lindqvist et al. ............. 455/403 |
| 2008/0279153 A1 | 11/2008 | Xie et al. |
| 2009/0005046 A1* | 1/2009 | Won et al. ...................... 455/436 |
| 2009/0016286 A1* | 1/2009 | Fajardo et al. ................ 370/329 |
| 2009/0036132 A1 | 2/2009 | Liu et al. |
| 2009/0109927 A1* | 4/2009 | Suh et al. ....................... 370/331 |
| 2009/0296635 A1* | 12/2009 | Hui et al. ....................... 370/328 |
| 2009/0325581 A1* | 12/2009 | Lu et al. ......................... 455/436 |
| 2010/0082739 A1* | 4/2010 | Martin et al. .................. 709/203 |
| 2010/0151858 A1* | 6/2010 | Brisebois et al. .............. 455/434 |
| 2010/0184439 A1* | 7/2010 | Chen et al. ..................... 455/436 |
| 2010/0210273 A1* | 8/2010 | Jun et al. ....................... 455/450 |
| 2010/0216467 A1 | 8/2010 | Ryan et al. |
| 2010/0246532 A1* | 9/2010 | Olvera-Hernandez et al. ............................ 370/331 |

FOREIGN PATENT DOCUMENTS

| | | |
|---|---|---|
| EP | 2003918 A1 | 12/2008 |
| EP | 2209340 A1 | 7/2010 |
| WO | 2009000790 | 12/2008 |

OTHER PUBLICATIONS

Pedro et al., "Dynamic Media Independent Information Server", IEEE 2010, pp. 865-872.
International Search Report and Written Opinion—PCT/US2012/062792—ISA/EPO—Feb. 20, 2013.

* cited by examiner

*Primary Examiner* — Timothy Pham
(74) *Attorney, Agent, or Firm* — Tyler J. Overall

(57) ABSTRACT

According to certain aspects, a first base station (BS) of a first power class type (e.g., a femtocell BS) that provides access service to devices capable of performing media independent handover (MIH) may perform a scan to detect available networks and send results of the scan to a second BS of a second power class type for updating information in a MIH information services database. The BS of the second power class type may receive the results of the scan and update an MIH information services database based on the received results.

26 Claims, 4 Drawing Sheets

DYNAMICALLY POPULATING MEDIA INDEPENDENT HANDOVER (MIH) INFORMATION SERVICE DATABASE

BACKGROUND

I. Field

The present disclosure relates generally to communication and, more specifically, to techniques for updating information that may help support media independent handover (MIH).

II. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is LTE. LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

Some UEs have multiple radios allowing them to communicate with multiple radio access technologies (RATs). With the proliferation of multi-radio devices and multiple available networks, one challenge is how to reduce power consumption caused by unnecessarily scanning and detecting networks.

Some services, such as Media Independent Handover (MIH), defined by IEEE 802.21, have addressed this problem by providing information about network links available at a particular geographic location. MIH Services offers mobile devices a seamless, standardized approach to handover between diverse networks, which promises to enhance user experience.

Unfortunately, much of the information used to accomplish MIH is static and programmed into a device. Without up-to-date information regarding available network links, a device capable of performing MIH may still need to perform network scans, resulting in unnecessary power consumption.

SUMMARY

Certain aspects provide a method for wireless communications. The method generally includes performing, by a first base station of a first power class type that provides access service to devices capable of performing media independent handover (MIH), a scan to detect available networks and sending results of the scan to a second base station of a second power class type for updating information in a MIH information services database.

Certain aspects provide a method for wireless communications. The method generally includes receiving, by a second base station of a second power class type that provides access service to devices capable of performing media independent handover (MIH), results of scan to detect available networks performed by a first base station of a first power class type and updating an MIH information services database based on the received results.

Certain aspects provide an apparatus for wireless communications. The apparatus generally includes means for performing, by a first base station of a first power class type that provides access service to devices capable of performing media independent handover (MIH), a scan to detect available networks and means for sending results of the scan to a second base station of a second power class type for updating information in a MIH information services database.

Certain aspects provide an apparatus for wireless communications. The apparatus generally includes means for receiving, by a second base station of a second power class type that provides access service to devices capable of performing media independent handover (MIH), results of scan to detect available networks performed by a first base station of a first power class type and means for updating an MIH information services database based on the received results.

Certain aspects of the present disclosure provide an apparatus for wireless communications. The apparatus generally includes at least one processor configured to perform, by a first base station of a first power class type that provides access service to devices capable of performing media independent handover (MIH), a scan to detect available networks and send results of the scan to a second base station of a second power class type for updating information in a MIH information services database; and a memory coupled with the at least one processor.

Certain aspects of the present disclosure provide an apparatus for wireless communications. The apparatus generally includes at least one processor configured to receive, by a second base station of a second power class type that provides access service to devices capable of performing media independent handover (MIH), results of scan to detect available networks performed by a first base station of a first power class type and update an MIH information services database based on the received results; and a memory coupled with the at least one processor.

Certain aspects of the present disclosure provide a computer program product comprising a computer readable medium having instructions stored thereon. The instructions are generally executable by one or more processors for performing, by a first base station of a first power class type that provides access service to devices capable of performing media independent handover (MIH), a scan to detect available networks and sending results of the scan to a second base station of a second power class type for updating information in a MIH information services database.

Certain aspects of the present disclosure provide a computer program product comprising a computer readable medium having instructions stored thereon. The instructions are generally executable by one or more processors for receiving, by a second base station of a second power class type that provides access service to devices capable of performing media independent handover (MIH), results of scan to detect available networks performed by a first base station of a first power class type and updating an MIH information services database based on the received results

DETAILED DESCRIPTION

Certain aspects of the present disclosure may help keep information for performing media independent handover (MIH) current, by having base stations of different power class types (such as femtocell or picocell base stations) scan their coverage areas to detect other available networks. Results of the scan may be relayed to a network provider where it may be used to provide dynamic updates to an MIH information service database. Operators may, thus, be able to provide more accurate and up-to-date information to devices it supports than if only static MIH information was provided to the devices.

As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), LTE, IEEE 802.20, IEEE 802.16 (WiMAX), and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 1:
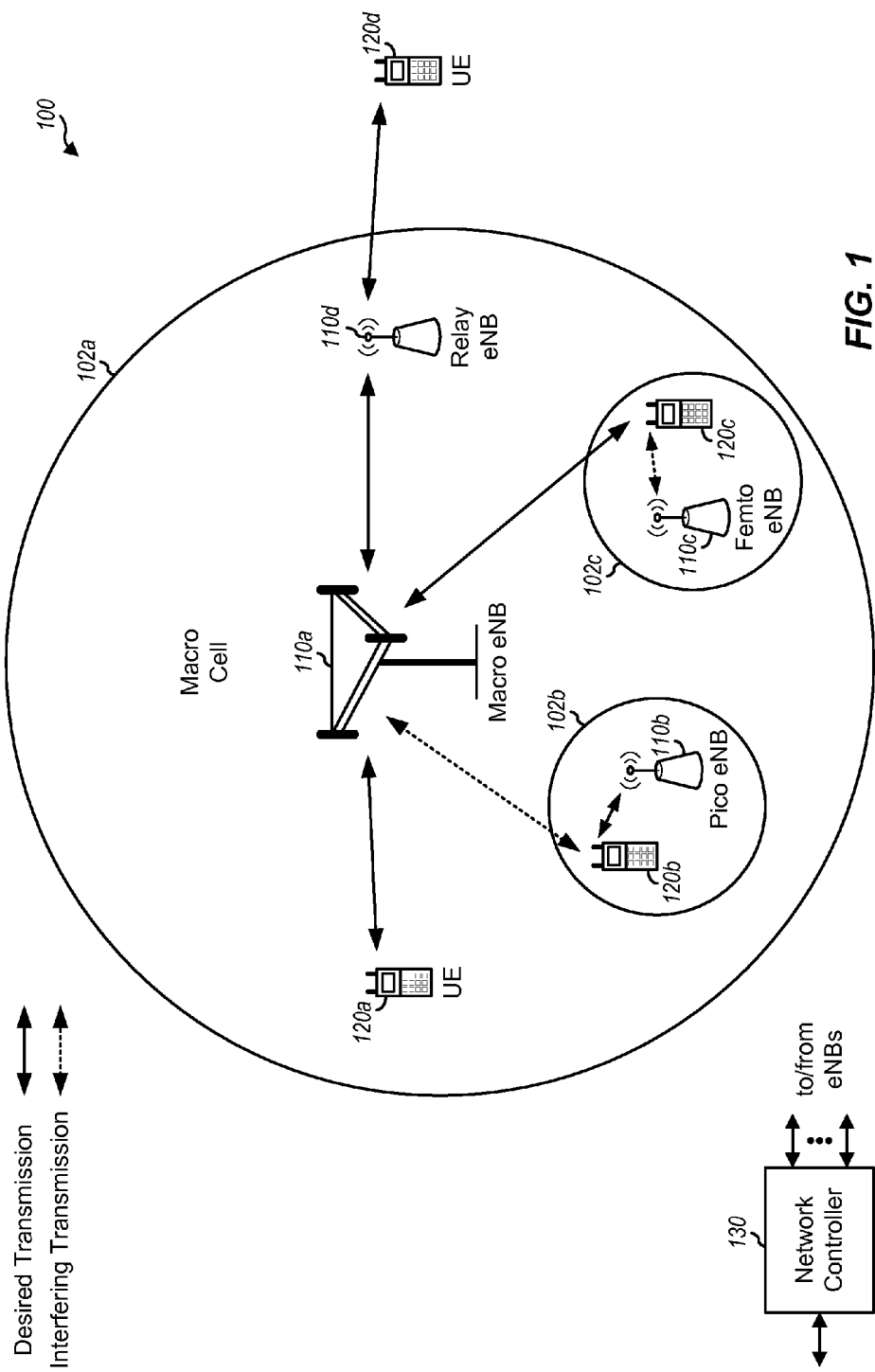
FIG. 1 is a block diagram conceptually illustrating an example of a wireless communications network in accordance with certain aspects of the present disclosure.

FIG. 1 shows a wireless communication network 100 in which procedures described for determining one or more groups of subframes may be performed. The network 100 may be an LTE network or some other wireless network. Wireless network 100 may include a number of evolved Node Bs (eNBs) 110 and other network entities. An eNB is an entity that communicates with UEs and may also be referred to as a base station, a Node B, an access point, etc. Each eNB may provide communication coverage for a particular geographic area. In 3PP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

As will be described in greater detail below, according to certain aspects, eNBs may perform inter-cell interference coordination (ICIC). ICIC may involve negotiation between eNBs to achieve resource coordination/partitioning to allocate resources to an eNB located near the vicinity of a strong interfering eNB. The interfering eNB may avoid transmitting on the allocated/protected resources, possibly except for a CRS. A UE can then communicate with the eNB on the protected resources in the presence of the interfering eNB and may observe no interference (possibly except for the CRS) from the interfering eNB UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

Figure 2:
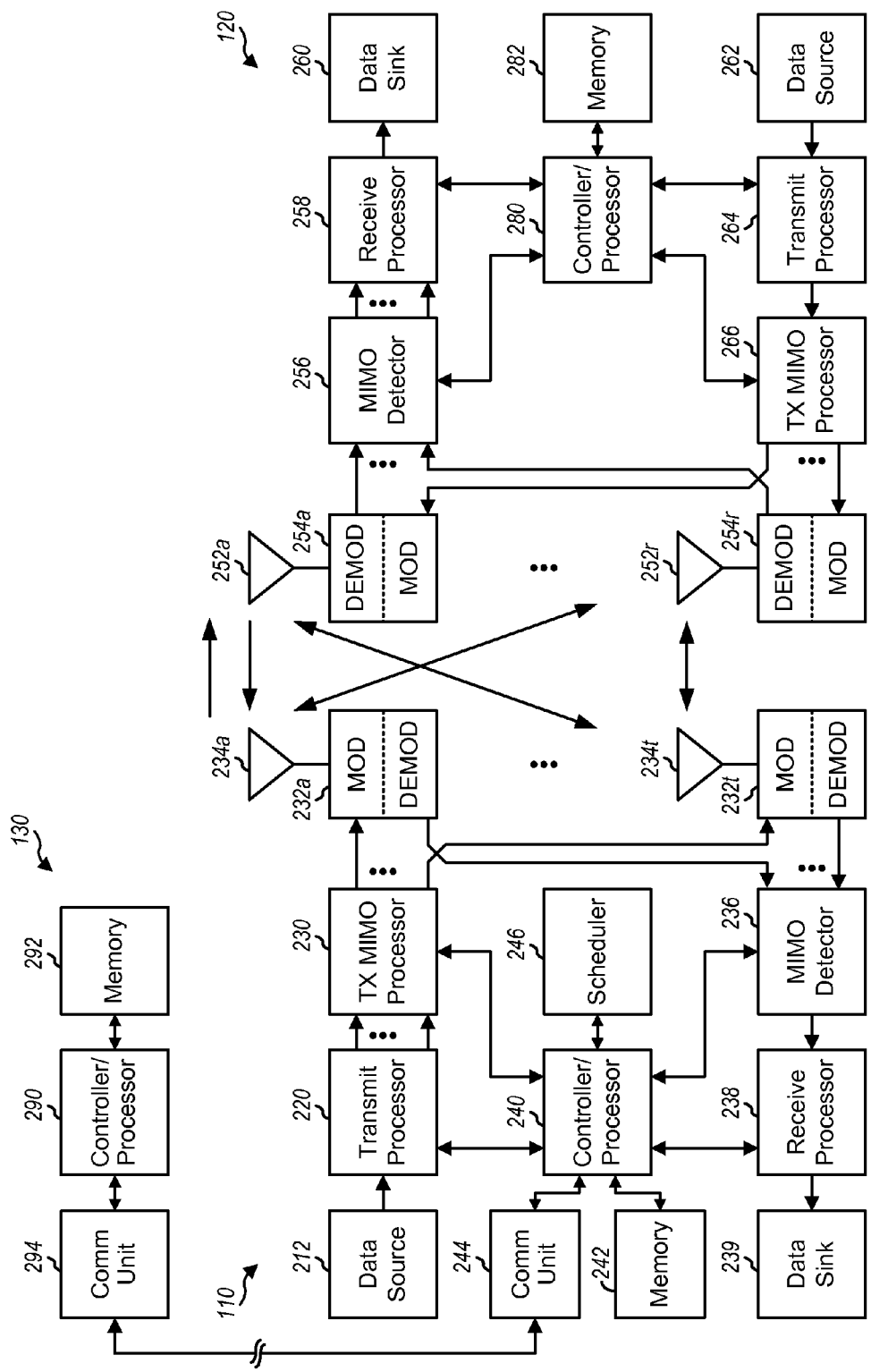
FIG. 2 shows a block diagram conceptually illustrating an example of a Node B in communication with a user equipment device (UE) in a wireless communications network in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor 284 may determine RSRP, RSSI, RSRQ, CQI, etc., as described below.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240.

Controllers/processors 240 and 280 may direct the operation at base station 110 and UE 120, respectively. Processor 240 and/or other processors and modules at base station 110 may perform or direct operations for configuring a UE for various random access procedures and identify one or more attributes during such procedures, as described herein. For example, processor 280 and/or other processors and modules at UE 120 may perform or direct operations for various random access procedures described herein. Memories 242 and 282 may store data and program codes for base station 110 and UE 120, respectively. A scheduler 244 may schedule UEs for data transmission on the downlink and/or uplink.

Dynamically Populating MIH Information Service Database

As described above, Media Independent Handover (MIH), as developed in IEEE 802.21, aims to provide a mechanism so that devices may move freely about and receive services in a heterogeneous network of diverse radio access technologies (RATs). MIH services allow the heterogeneous network to appear as a single extended network to the MIH capable device.

The MIH Information Service generally refers to a database that contains network information that can be used to support decision engines. The MIH Information Service generally provides a unified framework to higher-layer entities across a heterogeneous network environment to facilitate discovery and selection of multiple types of networks existing within a geographical area, with the goal of performing seamless handover across these networks.

Unfortunately, MIH Information Service is limited by the type and amount of information that is stored and deployed about links available at a particular geographic location. As much of this information is static and programmed, a device may still need to perform network scans to allow for optimal handover decisions. These network scans cause increased power consumption and may shorten the useful battery life of a mobile device.

Certain aspects of the present disclosure, however, may enhance the efficiency of MIH by providing up-to-date dynamic information about links available. As a result, operators may be able to provide accurate information to prospective devices which, in turn, may save power by eliminating the need for unnecessary network scans.

As described above, heterogeneous networks may utilize base stations of different class types to enhance coverage. For example, femtocell base stations have gained in popularity, for use in enhancing coverage in high demand areas and may be used to fill in so-called "coverage holes" as illustrated in FIG. 1.

According to certain aspects, in addition to providing the actual access service to devices, femtocell base stations (or other power class types) may also be configured to scan the area for other available networks. This information may then be relayed back to an operator to update its MIH information service, which may help provide accurate information to MIH-capable devices it supports while eliminating for those device to perform unnecessary network scans.

In this manner, certain aspects may help keep information current by enlisting different power class type base stations, such as femtocell base stations, to perform operations normally performed by a UE, namely actively scanning available networks in targeted areas and dynamically populating this data back to the original operator.

Figures 3, 4:
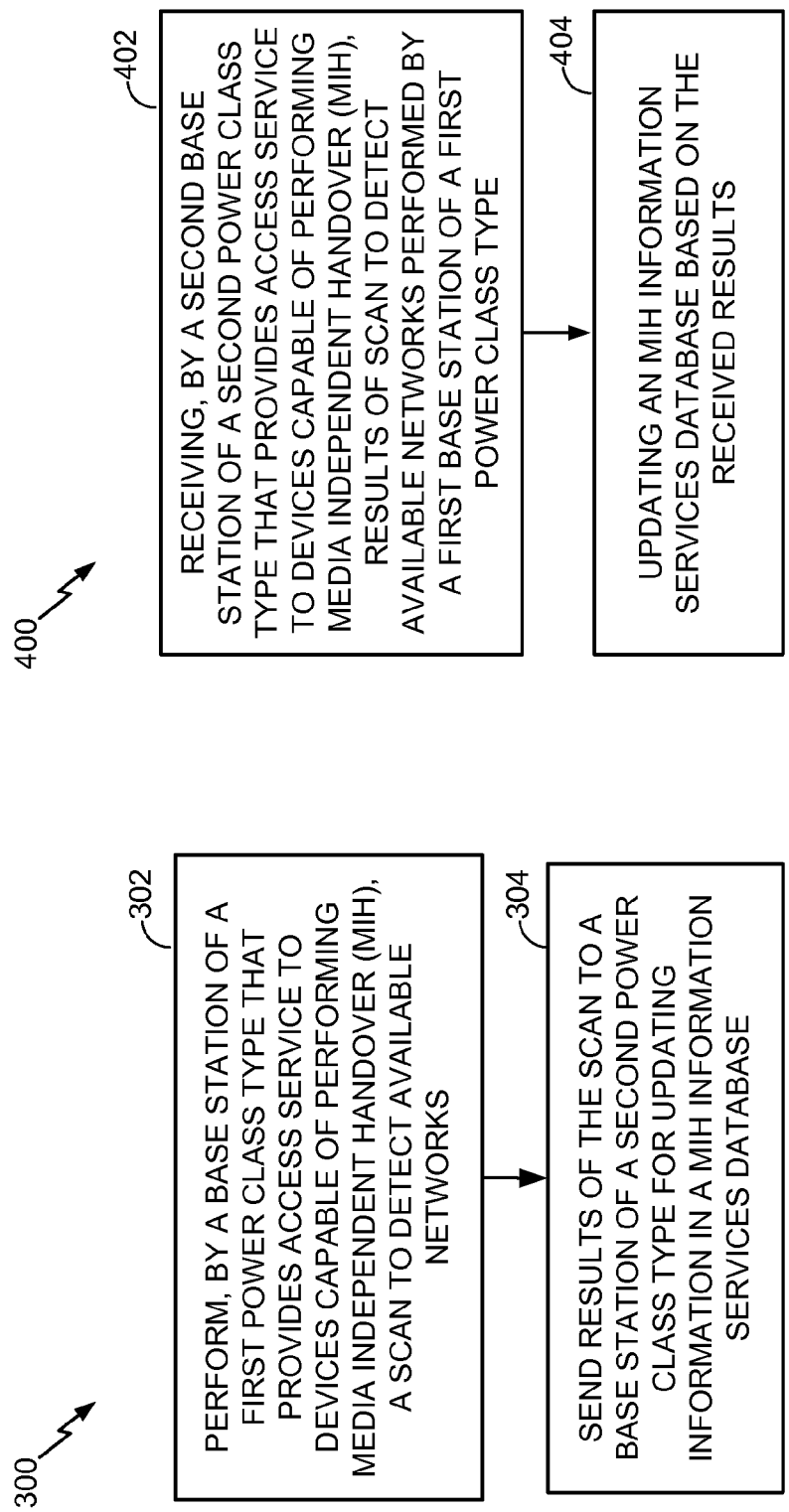
FIG. 3 illustrates example operations that may be performed by a base station (e.g., of a femtocell) for updating an MIH information service database, in accordance with certain aspects of the present disclosure.
FIG. 4 illustrates example operations that may be performed by a base station (e.g., of a macrocell) for updating an MIH information service database, in accordance with certain aspects of the present disclosure.

FIG. 3 illustrates example operations 300 that may be performed by a base station for updating an MIH information service database, in accordance with certain aspects of the present disclosure. The operations 300 may be performed, for example, by a femtocell base station or any other type of base station.

The operations 300 begin, at 302, by performing, by a first base station of a first power class type that provides access service to devices capable of performing media independent handover (MIH), a scan to detect available networks. At 304, the results of the scan to a second base station of a second power class type for updating information in a MIH information services database.

FIG. 4 illustrates example operations 400 that may be performed by a base station for updating an MIH information service database, in accordance with certain aspects of the present disclosure. The operations 400 are complementary to operations 300 of FIG. 3 and may be performed, for example, by a macro base station or any other type of base station.

The operations 400 begin, at 402, by receiving, by a second base station of a second power class type that provides access service to devices capable of performing media independent handover (MIH), results of scan to detect available networks performed by a first base station of a first power class type. At 404, an MIH information services database is updated based on the received results.

Figure 5:
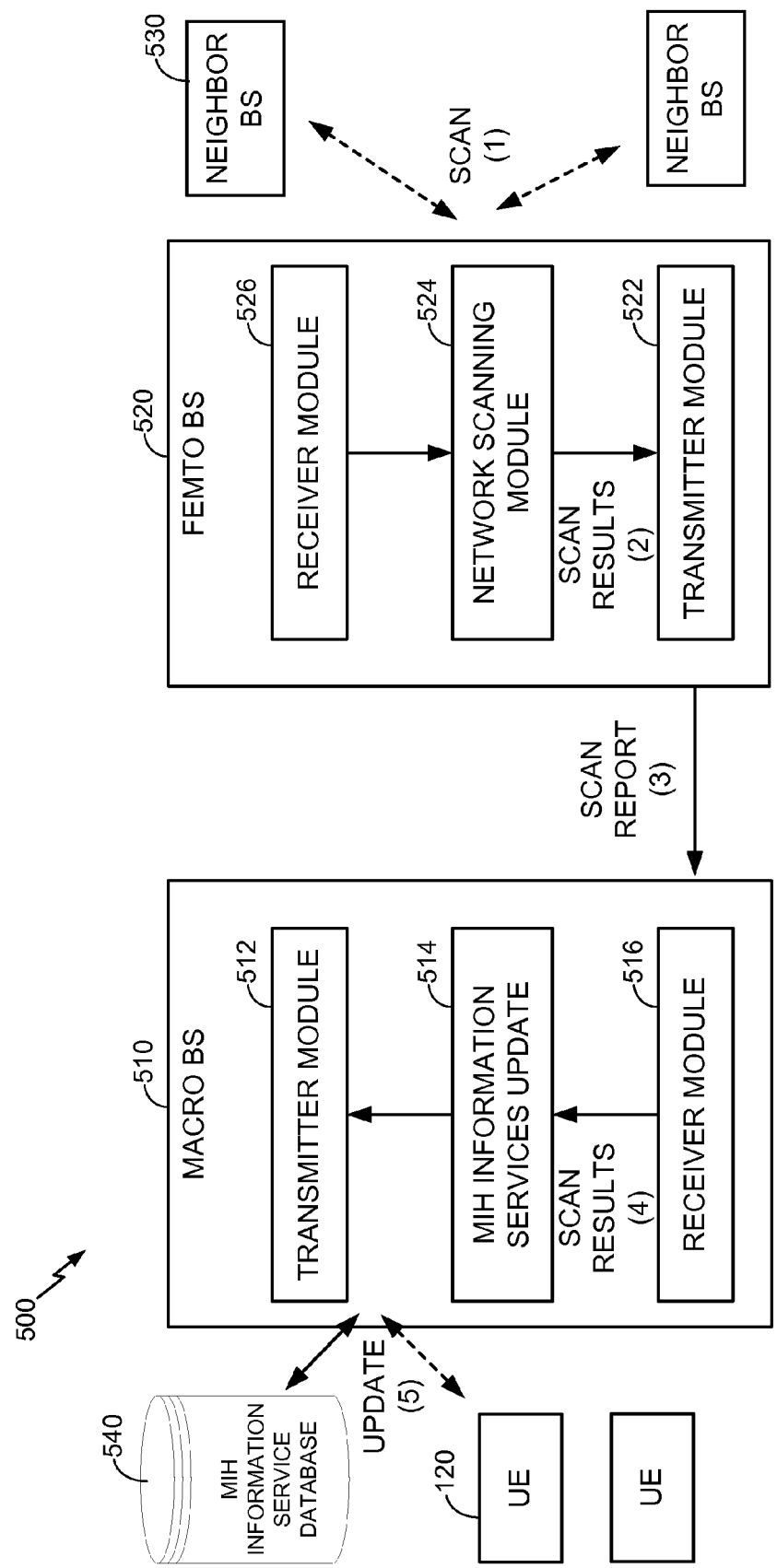
FIG. 5 illustrates an example system with a macro base station (BS) and a femto BS, capable of performing operations to update an MIH information service database, in accordance with certain aspects of the present disclosure.

The operations of FIGS. 3 and 4 may be described, in greater detail with reference to FIG. 5, which illustrates an example system with a macro base station (BS) and a femto BS, capable of performing operations to update an MIH information service database, in accordance with certain aspects of the present disclosure.

The figure illustrates an example sequence of operations, designated by ordered numbers, corresponding to a scan and reporting process. As illustrated, a femto BS 520 may have a receiver module 526 and network scanning module 524 configured to perform a network scan (1) to detect the presence and information about one or more neighbor BSs 530.

The network scanning module may process the results (2) and extract information to be forwarded to the macro BS 510 via a scan report (3). The scan report may be sent wirelessly or via a wired connection, such as a wired backhaul link connecting the femto and macro BSs.

The macro MS may receive the scan report, via a wired or wireless receiver module 516, and provide the scan results (4) to an MIH information services update module 514 for processing. The MIH Information Service update module 514 may process the scan results and send an update (5) to a MIH information service database 540, maintained by the network.

As illustrated, the macro BS 510 may also send an update to one or more UEs 120, thereby providing accurate information to those UEs for use in performing MIH, without requiring the UEs to perform their own scan to obtain such up-to-date information.

There are several potential advantages to enlisting a base station to perform scanning and reporting as described herein. For example, a base station may be able to support more sophistic scanning functionality than a UE is capable of (e.g. because of a directional receiver or high sensitivity receiver). Information received in this manner may provide more accurate geographical relationships between different base stations. In addition, base stations may be able to measure timing differences on the reference signals (e.g. the CRS) or synchronization signals (i.e. PSS and SSS) to assist a UE on initial acquisition and, therefore, reduce time needed for a UE to tune away onto different RF channels. Getting the same result by a manual static setting would likely be very time-consuming and prone to mistake due to constant changes in the location of a Femto BS or Pico BS.

Other advantages may be gained because base stations typically are not battery powered. This may allow more frequency scan without concern on the battery drainage as on typical UE. Thus, a Femto BS may be able to provide additional information, such as the noise level at a particular location over a day, back to the Macro BS. This information may be used for network tuning, which might typically otherwise be done by a field test engineer or a specialized UE for a shorter period of time, with less useful results.

The type of information sent in the scan report may include any type of information suitable to update the MIH Information Service (IS) database 540 to provides database access and retrieval of network availability, parameters and services for both serving and neighboring access networks. Examples of such information includes information about heterogeneous geographical network maps, service costs, QoS functionalities, and roaming partners. The IS may also provide neighboring network information about user and network operator policies for optimal initial network attachment or network re-selection in idle mode, for given geographical locations. This information may be updated based on the results of the scan report.

The femto BS may perform the network scan and send the scan report in any suitable manner. Various optimizations may be made to the scanning and reporting process presented herein. For example, in some cases femto BSs may be configured to perform neighbor scans periodically. In some cases, the femto BS may perform a scan and/or send results in response to a request sent from a macro BS.

According to certain aspects, the femto BSs may be provided with current network information from the MIH Information Services database. In such cases, the femto BSs may only send scan reports if the neighbor scans indicate a change in the available networks relative to the current network information. To reduce the amount of information transmitted, the femto BS may only send an indication of what has changed. For example, the scan report may indicate the addition of a network entity or that a previously existing network entity was no longer detected. The macro BS may the update the MIH information services database accordingly.

The techniques provided herein, and the information obtained thereby, may provide benefits in addition to reduced power consumption by UEs. For example, by having a femtocell scan targeted areas, an operator may be able to gain "competitive" information. For example, based on the information, the operator may observe a high demand at a particular site with several other operators establishing networks to fill in those areas. This type of information may provide good strategic data points regarding whether or not the operator should expand its coverage in that area.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications, comprising:
   receiving, by a first base station of a first power class type that provides access service to devices capable of performing media independent handover (MIH), network information from an MIH information services database;
   performing, by the first base station, a scan to detect available networks;
   providing, by the first base station, results of the scan to the MIH information services database, the results of the scan representing a change in available networks relative to the received network information; and
   sending, by the first base station, results of the scan to a second base station of a second power class type to enable the second base station to update information in the MIH information services database, wherein sending the results comprises sending the results via a wired connection between the first and second base stations.

2. The method of claim 1, wherein the first base station comprises a base station of a femtocell.

3. The method of claim 1, wherein sending results of the scan comprises:
   sending at least one of service costs, QoS functionalities, and roaming partners corresponding to one or more detected networks.

4. The method of claim 1, wherein the scan is performed using at least one of a directional receiver or a high sensitivity receiver.

5. The method of claim 1, wherein the results comprise timing information regarding at least one of a reference signal or a synchronization signal.

6. The method of claim 1, wherein the results comprise a noise level at a particular location over a predetermined period of time.

7. A method for wireless communications, comprising:
   sending, by a media independent handover (MIH) information services database, network information to a first base station of a first power class type;

receiving, by the MIH information services database, results of a scan to detect available networks, wherein the scan is performed by the first base station of the first power class type based on the network information sent by the MIH information services database, the results of the scan representing a change in available networks relative to the sent network information, wherein the results of the scan are received from a second base station of a second power class type that received the results of the scan from the first base station via a wired connection between the first and second base stations; and updating, by the MIH information services database, information in the MIH information services database based on the received results.

8. The method of claim 7, wherein the first base station comprises a base station of a femtocell.

9. The method of claim 7, wherein receiving results of the scan comprises:
receiving at least one of service costs, QoS functionalities, and roaming partners corresponding to one or more detected networks.

10. The method of claim 7, wherein the results comprise timing information regarding at least one of a reference signal or a synchronization signal.

11. The method of claim 7, wherein the results comprise a noise level at a particular location over a predetermined period of time.

12. An apparatus for wireless communications, comprising:
means for receiving, by a first base station of a first power class type that provides access service to devices capable of performing media independent handover (MIH), network information from an MIH information services database;
means for performing, by the first base station, a scan to detect available networks;
means for providing, by the first base station, results of the scan to the MIH information services database, the results of the scan representing a change in available networks relative to the received network information; and
means for sending, by the first base station, results of the scan to a second base station of a second power class type to enable the second base station to update information in the MIH information services database, wherein the means for sending the results comprise means for sending the results via a wired connection between the first and second base stations.

13. The apparatus of claim 12, wherein the first base station comprises a base station of a femtocell.

14. The apparatus of claim 12, wherein the means for sending results of the scan comprises:
means for sending at least one of service costs, QoS functionalities, and roaming partners corresponding to one or more detected networks.

15. The apparatus of claim 12, wherein the scan is performed using at least one of a directional receiver or a high sensitivity receiver.

16. The apparatus of claim 12, wherein the results comprise timing information regarding at least one of a reference signal or a synchronization signal.

17. The apparatus of claim 12, wherein the results comprise a noise level at a particular location over a predetermined period of time.

18. An apparatus for wireless communications, comprising:

means for sending, by a media independent handover (MIH) information services database, network information to a first base station of a first power class type;
means for receiving, by the MIH information services database, results of a scan to detect available networks, wherein the scan is performed by the first base station of the first power class type based on the information sent by the MIH information services database, the results of the scan representing a change in available networks relative to the sent network information, wherein the results of the scan are received from a second base station of a second power class type that received the results of the scan from the first base station via a wired connection between the first and second base stations; and
means for updating, via the MIH information services database, information in the MIH information services database based on the received results.

19. The apparatus of claim 18, wherein the first base station comprises a base station of a femtocell.

20. The apparatus of claim 18, wherein the means for receiving results of the scan comprises:
means for receiving at least one of service costs, QoS functionalities, and roaming partners corresponding to one or more detected networks.

21. The apparatus of claim 18, wherein the results comprise timing information regarding at least one of a reference signal or a synchronization signal.

22. The apparatus of claim 18, wherein the results comprise a noise level at a particular location over a predetermined period of time.

23. An apparatus for wireless communications, comprising:
at least one processor configured to:
receive, by a first base station of a first power class type that provides access service to devices capable of performing media independent handover (MIH), network information from an MIH information services database,
perform, by the first base station, a scan to detect available networks,
provide, by the first base station, results of the scan to the MIH information services database, the results of the scan representing a change in available networks relative to the received network information, and
send, by the first base station, results of the scan to a second base station of a second power class type that is enabled to update information in the MIH information services database, and wherein the processor is configured to send the results of the scan via a wired connection between the first and second base stations; and
a memory coupled with the at least one processor.

24. An apparatus for wireless communications, comprising:
at least one processor configured to:
send, by a media independent handover (MIH) information services database, network information to a first base station of a first power class type,
receive, by the MIH information services database, results of a scan to detect available networks, wherein the scan is performed by the first base station of the first power class type based on the information sent by the MIH information services database, the results of the scan representing a change in available networks relative to the sent network information, wherein the results of the scan are received from a second base station of a second power class type that received the results of the scan from the first base station via a wired connection between the first and second base stations, and update, via the MIH information services database, information in the MIH information services database based on the received results; and a memory coupled with the at least one processor.

25. A computer program product comprising a non-transitory computer readable medium storing instructions thereon, the instructions executable by one or more processors for:

receiving, by a first base station of a first power class type that provides access service to devices capable of performing media independent handover (MIH), network information from an MIH information services database;

performing, by the first base station, a scan to detect available networks;

providing, by the first base station, results of the scan to the MIH information services database, the results of the scan representing a change in available networks relative to the received network information; and sending, by the first base station, results of the scan to a second base station of a second power class type, enabling the second base station to update information in the MIH information services database, wherein sending the results comprise sending the results via a wired connection between the first and second base stations.

26. A computer program product comprising a non-transitory computer readable medium storing instructions thereon, the instructions executable by one or more processors for:

sending, by a media independent handover (MIH) information services database, network information to a first base station of a first power class type;

receiving, by the MIH information services database, results of a scan to detect available networks, wherein the scan is performed by the first base station of the first power class type based on the information sent by the MIH information services database, the results of the scan representing a change in available networks relative to the sent network information, wherein the results of the scan are received from a second base station of a second power class type that received the results of the scan from the first base station via a wired connection between the first and second base stations; and updating, by the MIH information services database, information in the MIH information services database based on the received results.

* * * * *